United States Patent
Nielsen et al.

(10) Patent No.: US 12,550,069 B2
(45) Date of Patent: Feb. 10, 2026

(54) EXPOSURE CONTROL

(71) Applicant: Nokia Technologies Oy, Espoo (FI)

(72) Inventors: Sari Kaarina Nielsen, Espoo (FI); Sami-Jukka Hakola, Kempele (FI); Karol Schober, Helsinki (FI); Esa Tapani Tiirola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 18/251,099

(22) PCT Filed: Oct. 30, 2020

(86) PCT No.: PCT/EP2020/080544
§ 371 (c)(1),
(2) Date: Apr. 28, 2023

(87) PCT Pub. No.: WO2022/089757
PCT Pub. Date: May 5, 2022

(65) Prior Publication Data
US 2023/0403654 A1 Dec. 14, 2023

(51) Int. Cl.
*H04W 52/14* (2009.01)
(52) U.S. Cl.
CPC .................. *H04W 52/146* (2013.01)
(58) Field of Classification Search
CPC ............ H04W 52/146; H04W 52/365; H04W 52/367; H04W 52/242; H04W 72/046; H04L 5/0048
See application file for complete search history.

(56) References Cited

U.S. PATENT DOCUMENTS

| 2020/0112926 A1* | 4/2020 | Laghate | H04B 7/0695 |
| 2023/0276454 A1* | 8/2023 | Zhu | H04L 5/0051 370/329 |
| 2023/0284149 A1* | 9/2023 | Zhu | H04W 16/28 370/318 |

* cited by examiner

*Primary Examiner* — John J Lee
(74) *Attorney, Agent, or Firm* — Lippes Mathias LLP

(57) ABSTRACT

According to an example, there is provided an apparatus being configured to: receive, by a user device from an access node, at least one channel status reporting configuration dedicated for reporting exposure incidents of power or energy density, wherein the at least one channel status reporting configuration comprises at least one exposure indication sequence; determine or predict an exposure incident for at least one beam, and as a response to the determining or predicting the exposure incident adjust experienced transmission power, report the exposure incident to the access node by a channel status message comprising the at least one exposure indication sequence and information on the adjusting using physical channel resources according to the at least one channel status reporting configuration, and receive, as a response to the reporting, control information, wherein the control information comprises acknowledgement to the adjusting, transmission configuration and/or information request.

20 Claims, 5 Drawing Sheets

EXPOSURE CONTROL

RELATED APPLICATION

This application was originally filed as PCT Application No. PCT/EP2020/080544, filed on Oct. 30, 2020, of which is incorporated herein by reference in its entirety.

FIELD

The present disclosure relates to communication.

BACKGROUND

Maximum permissible exposure, MPE, regulation defines regulatory requirements and limits how much radiated power devices, such as user equipment, such as portable devices, may transmit as electromagnetic, EM, radiation when a human body is in close proximity of the device. For example, at frequencies above 6 GHz, the Federal communications commission, FCC, of the Unites States has defined limits on exposure. This frequency range overlaps with the FR2 frequency range of fifth generation, 5G, communication systems as defined by the third generation partnership project, 3GPP. Overall, predefined limits on exposure of a user to electromagnetic radiation may be established to ensure users do not risk biological effects of such radiation. An example of a biological effect is the warming of tissue.

BRIEF DESCRIPTION

According to some aspects, there is provided the subject-matter of the independent claims. Some embodiments are defined in the dependent claims.

According to an aspect, there is provided a method, comprising: receiving, by a user device from an access node, at least one channel status reporting configuration dedicated for reporting exposure incidents of power or energy density, wherein the at least one channel status reporting configuration comprises at least one exposure indication sequence; determining or predicting an exposure incident for at least one beam, and as a response to the determining or predicting the exposure incident adjusting experienced transmission power, reporting the exposure incident to the access node by a channel status message comprising the at least one exposure indication sequence and information on the adjusting using physical channel resources according to the at least one channel status reporting configuration, and receiving, as a response to the reporting, control information, wherein the control information comprises acknowledgement to the adjusting, transmission configuration and/or information request.

According to another aspect, there is provided a method, comprising: providing, by an access node, a user device with at least one channel status reporting configuration dedicated for reporting exposure incidents of power or energy density, wherein the at least one channel status reporting configuration comprises at least one exposure indication sequence; receiving a report of the exposure incident for at least one beam from the user device by a channel status message comprising the at least one exposure indication sequence and information on adjusting experienced transmission power carried out by the user device using physical channel resources according to the at least one channel status reporting configuration, and providing the user device with control information, wherein the control information comprises acknowledgement to the adjusting, transmission configuration and/or information request.

According to another aspect, there is provided an apparatus comprising at least one processor, at least one memory including computer program code, the at least one memory and the computer program code being configured to, with the at least one processor, cause the apparatus at least to: receive, by a user device from an access node, at least one channel status reporting configuration dedicated for reporting exposure incidents of power or energy density, wherein the at least one channel status reporting configuration comprises at least one exposure indication sequence; determine or predict an exposure incident for at least one beam, and as a response to the determining or predicting the exposure incident adjust experienced transmission power, report the exposure incident to the access node by a channel status message comprising the at least one exposure indication sequence and information on the adjusting using physical channel resources according to the at least one channel status reporting configuration, and receive, as a response to the reporting, control information, wherein the control information comprises acknowledgement to the adjusting, transmission configuration and/or information request.

According to another aspect, there is provided an apparatus comprising at least one processor, at least one memory including computer program code, the at least one memory and the computer program code being configured to, with the at least one processor, cause the apparatus at least to: provide, by an access node, a user device with at least one channel status reporting configuration dedicated for reporting exposure incidents of power or energy density, wherein the at least one channel status reporting configuration comprises at least one exposure indication sequence; receive a report of the exposure incident for at least one beam from the user device by a channel status message comprising the at least one exposure indication sequence and information on adjusting experienced transmission power carried out by the user device using physical channel resources according to the at least one channel status reporting configuration, and provide the user device with control information, wherein the control information comprises acknowledgement to the adjusting, transmission configuration and/or information request.

According to an aspect, there is provided an apparatus, comprising: means for receiving, by a user device from an access node, at least one channel status reporting configuration dedicated for reporting exposure incidents of power or energy density, wherein the at least one channel status reporting configuration comprises at least one exposure indication sequence; means for determining or predicting an exposure incident for at least one beam, and as a response to the determining or predicting the exposure incident adjusting experienced transmission power, means for reporting the exposure incident to the access node by a channel status message comprising the at least one exposure indication sequence and information on the adjusting using physical channel resources according to the at least one channel status reporting configuration, and means for receiving, as a response to the reporting, control information, wherein the control information comprises acknowledgement to the adjusting, transmission configuration and/or information request.

According to an aspect, there is provided an apparatus, comprising: means for providing, by an access node, a user device with at least one channel status reporting configuration dedicated for reporting exposure incidents of power or energy density, wherein the at least one channel status reporting configuration comprises at least one exposure indication sequence; means for receiving a report of the exposure incident for at least one beam from the user device by a channel status message comprising the at least one exposure indication sequence and information on adjusting experienced transmission power carried out by the user device using physical channel resources according to the at least one channel status reporting configuration, and means for providing the user device with control information, wherein the control information comprises acknowledgement to the adjusting, transmission configuration and/or information request.

According to an aspect, there is provided a computer program product for an apparatus, comprising software code portions for performing, when said product is run on the apparatus: receiving, by a user device from an access node, at least one channel status reporting configuration dedicated for reporting exposure incidents of power or energy density, wherein the at least one channel status reporting configuration comprises at least one exposure indication sequence; determining or predicting an exposure incident for at least one beam, and as a response to the determining or predicting the exposure incident adjusting experienced transmission power, reporting the exposure incident to the access node by a channel status message comprising the at least one exposure indication sequence and information on the adjusting using physical channel resources according to the at least one channel status reporting configuration, and receiving, as a response to the reporting, control information, wherein the control information comprises acknowledgement to the adjusting, transmission configuration and/or information request.

According to an aspect, there is provided a computer program product for an apparatus, comprising software code portions for performing, when said product is run on the apparatus: providing, by an access node, a user device with at least one channel status reporting configuration dedicated for reporting exposure incidents of power or energy density, wherein the at least one channel status reporting configuration comprises at least one exposure indication sequence; receiving a report of the exposure incident for at least one beam from the user device by a channel status message comprising the at least one exposure indication sequence and information on adjusting experienced transmission power carried out by the user device using physical channel resources according to the at least one channel status reporting configuration, and providing the user device with control information, wherein the control information comprises acknowledgement to the adjusting, transmission configuration and/or information request.

LIST OF THE DRAWINGS

DESCRIPTION OF EMBODIMENTS

Figure 1:
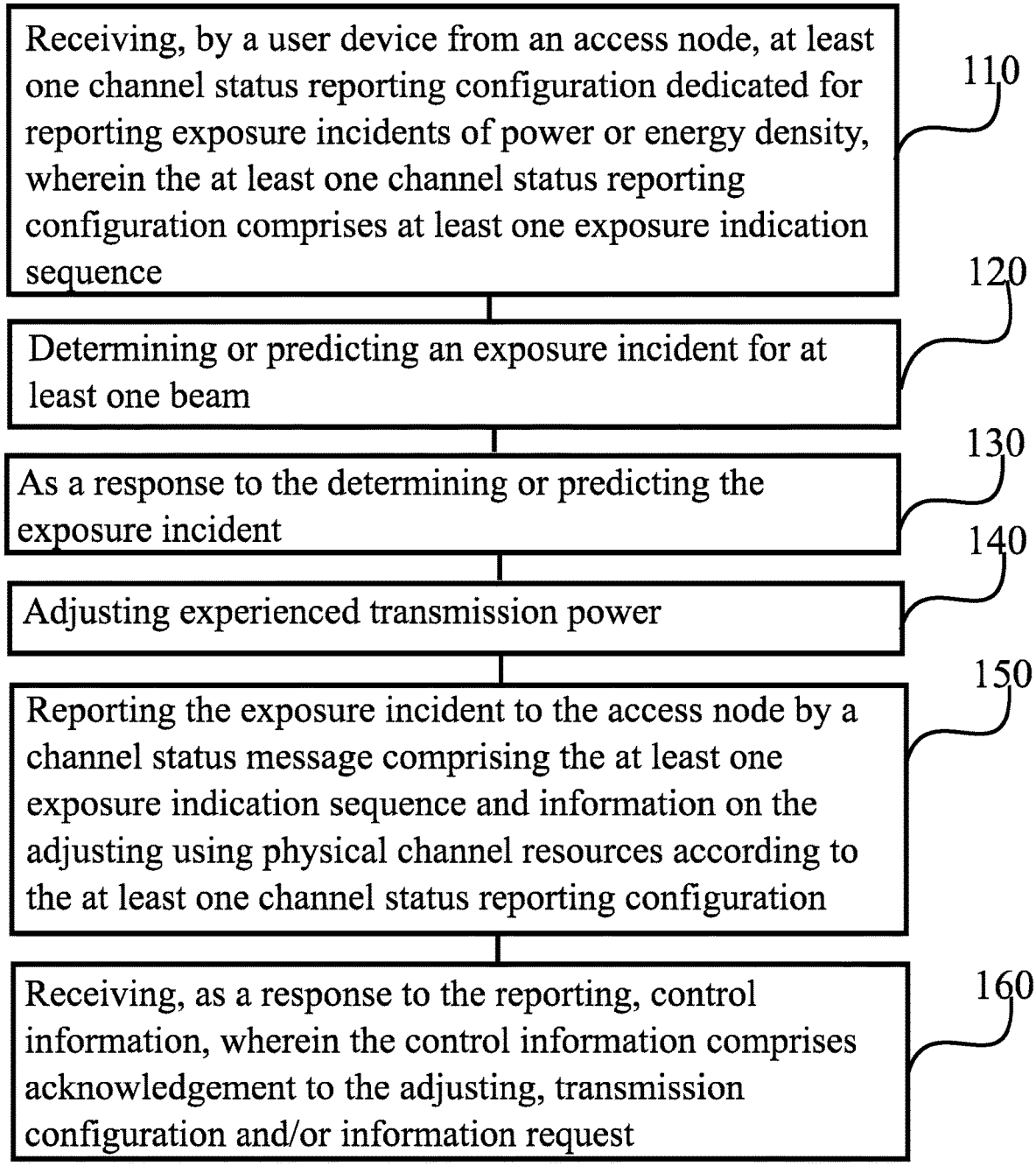
FIG. 1 illustrates a flow chart in accordance with at least some embodiments.

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. It is to be understood that the use of "a" or "an", that is, a singular form, throughout this document does not exclude a plurality.

Reference numbers, both in the description of the embodiments and in the claims serve to illustrate the embodiments with reference to the drawings, without limiting it to these examples only.

The embodiments and features, if any, disclosed in the following description that do not fall under the scope of the independent claims are to be interpreted as examples useful for understanding various embodiments.

Examples of an access architecture to which the embodiments are applicable include the following: a radio access architecture based on new radio (NR, 5G), or future cellular technologies (e.g. 6G or the like) without restricting the embodiments to such an architecture, however. Some other examples are wireless local area network (WLAN or Wi-Fi), worldwide interoperability for microwave access (WiMAX), wideband code division multiple access (WCDMA), systems using ultra-wideband (UWB) technology, sensor networks, mobile ad-hoc networks (MANETs) and Internet Protocol multimedia subsystems (IMS) or any combination thereof.

A user device (user terminal, user equipment) typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device or a connection module of a vehicle. It should be appreciated that a user device may also be a nearly exclusive uplink only device, of which an example is a camera or video camera loading images or video clips to a network. A user device, or terminal device, may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

In the following, embodiments suitable for adjusting experienced transmission power with regard to FCC's maximum permissible exposure regulation are disclosed.

FCC's MPE regulation defines regulatory requirements and limits how much power portable devices at frequencies above 6 GHz (like at frequency range 2 (FR2) frequencies and beyond) may transmit when human body is in close proximity of the devices. FR2 NR user devices are allowed to reduce their transmit power as much as necessary using Power Management Maximum Power Reduction (P-MPR) to meet the MPE regulatory requirements. In case of large user device transmission (TX) power reduction i.e. in case of large P-MPR value the access node (gNB) may no longer receive user device's transmitted signalling causing unpredictable radio link failures and thus, even connection releases. For enhancing radio link reliability, a quick or even proactive indication of reporting MPE situations is needed. A framework to indicate MPE conditions in a dynamic manner is provided.

One embodiment starts in block 100 of FIG. 1. This embodiment is suitable for being carried out by a user device. (user equipment, etc).

In block 110, at least one channel status reporting configuration dedicated for reporting exposure incidents of power or energy density is received from an access node (such as gNB or a distributed unit DU), wherein the at least one channel status reporting configuration comprises at least one exposure indication sequence. An example of the exposure indication sequence is a specific Zadoff-Chu sequence/cyclic shift, or a specific CAZAC (Constant Amplitude Zero AutoCorrelation) sequence/cyclic shift, or a specific computer-search based ZAC (Zero AutoCorrelation) sequence/cyclic shift. Another example is a specified channel state indication (CSI). The sequence may comprise one or more bits or symbols. CSI may be transmitted either on via physical uplink control channel (PUCCH) or physical uplink shared channel (PUSCH). It may be a periodical resource provided for the user device, or it may be triggered by the access node. The channel status reporting configuration may further comprise an exposure incident condition (such as a threshold set for MPE for subset of beams or for all beams. This may be based on regulation as explained above directly or, especially for predicting, it may be set lower than what is required by regulations). The channel status reporting configuration comprises physical channel resource configuration such as scheduling request process configuration, channel state information process resources, data-less physical uplink shared channel resources, configured grant physical uplink shared channel resources, contention-based random access resources for MSG3 message and/or a contention-free random access resources. Some more detailed examples are given by example tables 1-3 and the description thereof.

It should be appreciated that a multi-layer connection comprises several layers of data, serving different protocol layers, respectively. While all layers of the multi-layer connection are conveyed using physical resources assigned to the connection, data of layers other than the physical layer is conveyed encoded into the respective layers, this encoding comprising processing such as error detection and correction coding, repeat requesting and/or other mechanisms which incur delay, wherefore using an indication on the physical layer, such as a specific sequence in a scheduling request or a specific PRACH preamble (may be the same sequence or sequence generated by using a cyclic shift operation), reduces delay. For example, the multiple layers may comprise, at least in part, the open systems interconnection, OSI, layers. The physical layer may comprise an L1 layer, for example an L1 layer of a 5G system.

Examples of reporting using suitable reporting configurations are discussed further detail below. They clarify the reporting configuration options with examples.

It should be appreciated that a user device may trigger the reporting the exposure incident and adjusting the experienced transmission power both when it has to reduce the transmit power and when it can increase the transmit power (and thereby transmit more UL data with wider bandwidth).

It should be appreciated that the channel status reporting configuration may be received once when the user device enters the cell provided by the access node, signalled periodically or as a part of other control signalling, or based on a request.

In block 120, an exposure incident for at least one beam is detected or predicted. In other words, the user device determines that exposure of a user to electromagnetic wave transmission from a device exceeds, or will exceed, an exposure incident condition (limit or threshold given in the channel status reporting configuration, separately signalled or based on firmware settings). The determination may comprise determining the threshold will be exceeded within one second, within 500 milliseconds, within 100 milliseconds or within 50 milliseconds, in other words within a time window given in the configuration, for example. The determining may be based, for example, on a determination that the user is interacting with the device, for example by using the device's user interface or using the device as a telephone. The prediction may be carried out by using proximity sensor data, that the user will soon be near the device. For example, the proximity sensor data may indicate the user, for example a user's hand, is approaching the device. The determining, or prediction, may be based at least partly on a current or scheduled transmit power of the device. The determining may be based at least partly on a combination of the transmit power, or scheduled transmit power, and the determination the user is interacting with the device and/or a combination of the transmit power, or scheduled transmit power, and the prediction that the user is approaching the device. For example, a table of transmit powers and user proximity may be consulted to determine the extent of user exposure to the radiation. Alternatively, a mathematical model may be employed to estimate the extent of user exposure, wherein the mathematical model may take as inputs the extent of user proximity and the transmit power. The limit or threshold may be frequency-specific, or frequency-band specific, for example. The table and/or the mathematical model may be given in the configuration.

In blocks 130, 140 and 150, as a response to the determining or predicting the exposure incident, experienced transmission power is adjusted and the exposure incident is reported to the access node by a channel status message comprising the at least one exposure indication sequence and information on the adjusting using physical channel resources according to the at least one channel status reporting configuration reported.

It should be appreciated that in many cases, what matters at the user device end with regard to the experienced transmission power is the beam direction (i.e. not only the Tx power or EIRP).

The experienced transmission power may be adjusted by decreasing the transmission power or by other means, such as changing a transmission beam, adjusting bandwidth, number of physical resource blocks, and/or maximum uplink duty cycle. Options for this autonomous adjustment may be preconfigured by the access node and given in the channel status reporting configuration.

For example, the channel status report indicating user device's MPE may utilize dedicated scheduling request (SR), when the user device is in radio resource control (RRC) connected state. Based on this "MPE dedicated SR" the access node may grant data-less PUSCH for "MPE dedicated CSI report" (or alternatively UCI on PUSCH), where the user device may provide more information on the exposure incident, for example in the form of bitmap elements corresponding the current active candidate beams. Alternatively, the user device may use configured grant PUSCH to provide "MPE dedicated CSI report" as well. One configured grant (CG) configuration may be dedicated for the report or the user device may trigger dedicated SR first and transmit CG PUSCH in subsequent CG occasions (with processing timeline met). In the case the user device is not in RRC connected state, the user device may use PRACH MSG3 message with an exposure indication sequence (Contention-based approach). Another option is to use contention free (dedicated) PRACH preamble in the similar fashion as in the dedicated scheduling request process discussed above. For example, contention-based PRACH is used in RRC Idle state while contention-free PRACH is used when in RRC Connected state, but not synchronized.

It should be understood that in the case that one beam pair link facing an MPE incident, the user device may not be able to transmit on PUSCH (physical uplink shared channel) on that beam pair link. Provided that the user device has multiple candidate uplink beams, the user device may request resources for PUSCH on a uplink beam pair link not impacted.

The reporting message may comprise, as an addition to the exposure indication informing: the amount of needed transmission power adjustment, uplink bandwidth request, number of physical resource blocks request, downlink/uplink resource configuration request, beam-pair request and/or maximum uplink duty cycle request for the adjusted transmission configuration in which case this information is expressed by the exposure indication sequence or a part of it that is selected accordingly. Another option is that the further informing is carried out as a response to a request received from an access node. The response may also comprise a suitable exposure indication sequence, or the information may be given in another format.

Some more detailed options are presented in the following.

By an MPE dedicated channel status report the user device may provide an access node with information on how much P-MPR (power reduction) the user device needs for the selected beam(s). Alternatively, the user device may provide more detailed information on what kind of uplink configurations (e.g. in terms of UL bandwidth or physical resource block (PRBs), downlink/uplink configuration etc) the user device can support for its uplink transmission for the selected beam(s) while still meeting the MPE requirements. Provided MPE information could be different for different beams especially for multi-panel user devices as different panels could be differently impacted by the human body (e.g. hand). For instance, human hand could be very close to one panel but further away from another panel and therefore MPE impact to uplink transmission may be rather different for different beams if different panels were used for transmitting on different beams. The user device may select suitable reporting resources from the received channel status reporting configuration.

Some more detailed examples are presented in the following.

When the user device is in a connected state, a scheduling request may be used as a specific trigger from the user device to the access node to request resources for a more detailed MPE information, or the scheduling request may be the request itself. The more detailed MPE indication may also be requested by the access node, such as a gNB.

Another option is to, configure a user device to perform CSI reporting to indicate which reference signals to form an uplink transmission beam would cause an exposure incident. As can be seen, the transmission configuration that is received from the access node as a response to the reporting of the incident, may be used for data transmission or control information signalling (the latter in the case, the transmission configuration is used for transmitting to the access node the more detailed information about the incident).

When following this approach, when the user device is not in a connected state transmitting a random access preamble may serve as the trigger, while SR may serve as a trigger in the RRC connected situation. MSG3 during the random access procedure may serve to deliver the detailed MPE information. Separate PRACH resources may be dedicated to detailed MPE.

The detailed MPE indication may be provided from the device as a CSI report, wherein a bitmap with elements corresponding to current active candidate beams. The beams may be for physical uplink control channel, PUCCH or physical uplink shared channel, PUSCH. The bitmap length may be, for example, a maximum number of PUCCH (or PUSCH) groups in spatial relation wise (up to 4 in Rel-16) or a maximum number of reference signals, RSs, for path loss estimation that the device can measure (up to 4 in Rel16), or similar. PUCCH carrying the indication may be triggered by a DCI format 1_1 which does not schedule PDSCH but provides UE with details on PUCCH slot and PUCCH resource that is used to transmit the indication. Regarding the PUSCH, the length of the bitmap could be the number of sounding reference signal, SRS, resources configured for codebook or non-codebook based PUSCH scheduled with downlink control information, DCI, format 0_1. SRS resources represent candidate transmit beams for the PUSCH. The device may trigger the indication when the candidate beam(s) are under a heavy MPE situation, for example when needed P-MPR is higher than a certain predefined or signalled exposure incident condition (threshold) or the device determines that the candidate beam(s) is/are going to face a worsened MPE situation. A modelling algorithm together with proximity sensors may be used to predict e.g. how human hand is approaching the device and therefore some proactive network actions could be taken.

In block 160, as a response to the reporting, control information is received, wherein the control information comprises acknowledgement to the adjusting, transmission configuration and/or information request. Depending on the scenario "control information" can be either DCI only (e.g. UL grant) or DCI+PDSCH (a new configuration). As to the information request, one scenario is that CSI-based report (e.g. periodic CSI) is a compact one (to reduce the payload), then a need for more detailed report may exist. The transmission configuration may include a beam pair link change between the access node and the user device.

The acknowledgement may be used to inform the user device that the access node is updated with information on user device's current usage of transmission resources, such a transmit power or used beam (in the case the user device is allowed or preconfigured to adjust autonomously shared resources, such as a radio beam. This may be based on the usage of a resource pool having instructions for shared usage). An example of the acknowledgement is an uplink grant message.

The transmission configuration may be adjusted according to the reported parameters, such as the amount of needed transmission power adjustment, uplink bandwidth request, number of physical resource blocks (PRBs) request, downlink/uplink resource configuration request, beam-pair request and/or maximum uplink duty cycle request for the adjusted transmission configuration (A duty cycle of the device may be reduced by the base node using dynamic scheduling, to thereby reduce an average transmission (TX) power emitted by the device. Further, a TX bandwidth and/or number of PRBs used by the device may be reduced). The access node has the responsibility of resource allocation in the network and it carries out the configuration as normally and may not follow the request, however. On the other hand, it may also adjust parameters that are not specifically requested by the user device. The access node may request for more information, if needed, as presented above. The transmission configuration may be used for all kind of transmission, control signalling and data, according to needs. The transmission configuration may be used for signalling the requested more detailed information as well.

The adjusting experienced transmission power, such as reduction, may take place a predetermined/configured time delay after the determination or prediction or reporting, such as 10 or 20 milliseconds, for example. The transmit power may be reduced on a per-transmit beam basis such that the transmit power of each transmit beam is modified The user device may later determine or predict that the proximity of the user no longer limits transmit power to the same extent, or at all. Then the device may transmit a corresponding report to the access node, informing of an option to increase transmit power. The report may comprise information on a per-transmit beam basis, how much the transmit power of individual ones of the transmit beams may be increased. Reporting may be carried out in a similar fashion as the reporting of the exposure incident by using an indication sequence either informing only on the option or also requesting new transmission configuration parameters, such as transmission power. The user device may then receive a new transmission configuration or return to the one used before the determining or predicting the exposure incident.

The information request may comprise requesting more information for a new transmission configuration. The information may be the amount of needed transmission power adjustment, uplink bandwidth request, number of physical resource blocks (PRBs) request, downlink/uplink resource configuration request, beam-pair request maximum uplink duty cycle request, a transmission bandwidth and/or number of PRBs.

Figure 2:
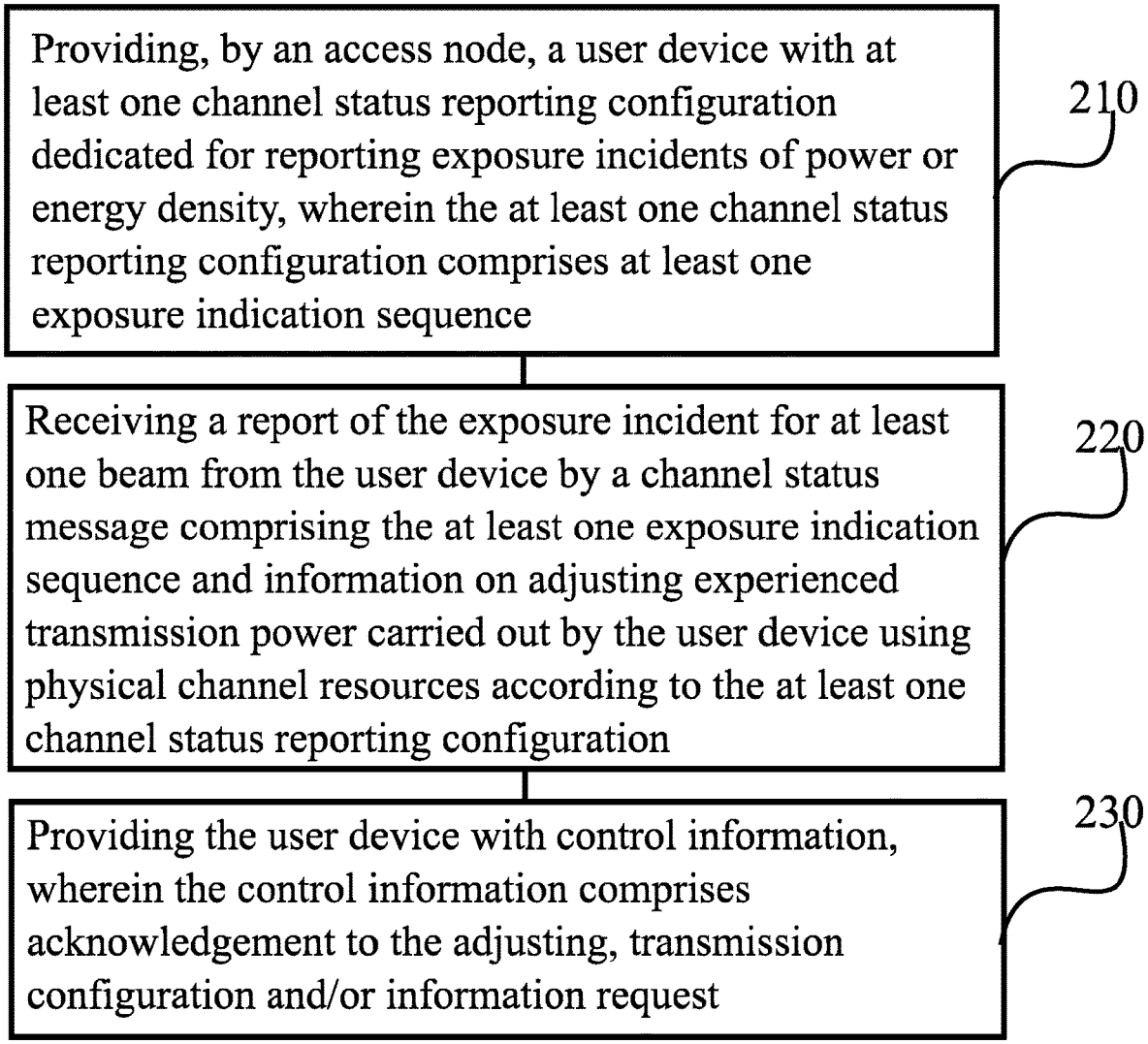
FIG. 2 illustrates a flow chart in accordance with at least some embodiments.

FIG. 2 presents an embodiment suitable for being carried out by an access node, distributed unit (DU) or integrated access and backhaul (IAB) node. It should be appreciated that cloud services may also applicable.

In block 210, a user device is provided with at least one channel status reporting configuration dedicated for reporting exposure incidents of power or energy density, wherein the at least one channel status reporting configuration comprises at least one exposure indication sequence. An example of the exposure indication is a specific Zadoff-Chu sequence/cyclic shift, or a specific CAZAC (Constant Amplitude Zero AutoCorrelation) sequence/cyclic shift, or a specific computer-search based ZAC (Zero AutoCorrelation) sequence/cyclic shift. Another example is a specified channel state indication (CSI). The sequence may comprise one or more bits or symbols. Some more detailed examples are given by example tables 1-3 and the description thereof. The channel status reporting configuration may further comprise an exposure incident condition (such as a threshold set for MPE for subset of beams or for all beams). The channel status reporting configuration comprises physical channel resource configuration such as scheduling request process configuration, channel state information process resources, data-less physical uplink shared channel resources, configured grant physical uplink shared channel resources, contention-based random access resources for MSG3 message and/or a contention-free random access resources. It should be appreciated that the channel status reporting configuration may be provided (transmitted, broadcast or multicast) once when the user device enters the cell provided by the access node, signalled periodically or as a part of other control signalling, or based on a request.

In block 220, a report of the exposure incident for at least one beam from the user device is received by a channel status message using physical channel resources according to the at least one channel status reporting configuration comprising the at least one exposure indication sequence and information on adjusting experienced transmission power carried out by the user device.

The experienced transmission power may be adjusted by decreasing the transmission power or by other means, such as changing a transmission beam, adjusting bandwidth, number of physical resource blocks, and/or maximum uplink duty cycle. Options for this autonomous adjustment may be preconfigured by the access node.

It should be appreciated that a user device may trigger the reporting the exposure incident and adjusting the experienced transmission power both when it has to reduce the transmit power and when it can increase the transmit power (and thereby transmit more UL data with wider bandwidth).

For example, the channel status (CSI) report indicating user device's MPE may utilize dedicated scheduling request (SR), when the user device is in radio resource control (RRC) connected state. Based on this "MPE dedicated SR" the access node may grant data-less PUSCH for "MPE dedicated CSI report" (or alternatively UCI on PUSCH), where the user device may provide more information on the exposure incident, for example in the form of bitmap elements corresponding the current active candidate beams. Alternatively, the user device may use configured grant PUSCH to provide "MPE dedicated CSI report" as well. One configured grant (CG) configuration may be dedicated for the report or the user device may trigger dedicated SR first and transmit CG PUSCH in subsequent CG occasions (with processing timeline met). In the case the user device is not in RRC connected mode, the user device may use PRACH MSG3 message with an exposure indication sequence (Contention-based approach). Another option is to use contention free (dedicated) PRACH preamble in the similar fashion as in the dedicated scheduling request process discussed above.

It should be understood that in the case that one beam pair link facing an MPE incident, the user device may not be able to transmit on PUSCH (physical uplink shared channel) on that beam pair link. Provided that the user device has multiple candidate uplink beams, the user device may request resources for PUSCH on a uplink beam pair link not impacted.

The reporting message may comprise, as an addition to the exposure indication informing: the amount of needed transmission power adjustment, uplink bandwidth request, number of physical resource blocks request, downlink/uplink resource configuration request, beam-pair request and/or maximum uplink duty cycle request for the adjusted transmission configuration, in which case the exposure incident indication or a part of it may be chosen accordingly. Another option is that the informing is carried out as a response to a request received from an access node. The access node may give information on the format and resources for the response.

Some options are presented in the following.

By an MPE dedicated channel status report the user device may provide the access node with information on how much P-MPR (power reduction) the user device needs for the selected beam(s). Alternatively, the user device may provide more detailed information on what kind of uplink configurations (e.g. in terms of UL bandwidth or physical resource block (PRBs), downlink/uplink configuration etc) the user device can support for its uplink transmission for the selected beam(s) while still meeting the MPE requirements. Provided MPE information could be different for different beams especially for multi-panel user devices as different panels could be differently impacted by the human body (e.g. hand). For instance, human hand could be very close to one panel but further away from another panel and therefore MPE impact to uplink transmission may be rather different for different beams if different panels were used for transmitting on different beams. The user device may select suitable reporting resources from the received channel status reporting configuration.

Some more detailed examples are presented in the description with regard to FIG. 1. For example, some channel status reporting configuration options are described by examples above.

In block 230, the user device is provided with control information, wherein the control information comprises acknowledgement to the adjusting, transmission configuration and/or information request. Depending on the scenario "control information" can be either DCI only (e.g. UL grant) or DCI+PDSCH (a new configuration). As to the information request, one scenario is that CSI-based report (e.g. periodic CSI) is a compact one (to reduce the payload), then a need for more detailed report may exist.

The acknowledgement may be used to inform the user device that the access node is updated with information on user device's current usage of transmission resources, such a transmit power or used beam (in the case the user device is allowed or preconfigured to adjust autonomously shared resources, such as a radio beam. This may be based on the usage of a resource pool having instructions for shared usage). An example of the acknowledgement is an uplink grant message.

The transmission configuration may be adjusted according to the reported parameters, such as the amount of needed transmission power adjustment, uplink bandwidth request, number of physical resource blocks (PRBs) request, downlink/uplink resource configuration request, beam-pair request and/or maximum uplink duty cycle request for the adjusted transmission configuration (A duty cycle of the device may be reduced by the base node using dynamic scheduling, to thereby reduce an average transmission (TX) power emitted by the device. Further, a TX bandwidth and/or number of PRBs used by the device may be reduced). The access node has the responsibility of resource allocation in the network and it carries out the configuration as normally and may not follow the request, however. On the other hand, it may also adjust parameters that are not specifically requested by the user device. The access node may request for more information, if needed, as presented above.

The information request may comprise requesting more information for a new transmission configuration. The information may be the amount of needed transmission power adjustment, uplink bandwidth request, number of physical resource blocks (PRBs) request, downlink/uplink resource configuration request, beam-pair request maximum uplink duty cycle request, a transmission bandwidth and/or number of PRBs.

In general, transmission configuration parameters may be adjusted to enable the connection to survive also with a reduced power level. For example, a coding rate may be changed to increase a resilience of the connection to point errors in data communicated over the connection. Modulation method used may be changed to a lower-order modulation, which is more resistant to a radio path which becomes relatively noisier with the transmit power at the device is reduced. A duty cycle of the device may be reduced by the base node using dynamic scheduling, to thereby reduce an average transmission power emitted by the device. Further, a transmission bandwidth and/or number of physical resource blocks (PRBs) used by the device may be reduced by the access node. As a result of the adjusting of the transmission configuration parameters, a bit rate of the connection may drop. One possible adjustment of the configuration parameters is to migrate the connection to a frequency band not affected by the preconfigured user EM exposure limit or threshold. In terms of a 5G system, this may comprise using frequency band FR1 instead of FR2. Adjusting of the transmission configuration parameters may comprise transmission beam selection or swap. For example, the user may grip a user device such that their hand is placed over one transmit antenna of the user device but not over another transmit antenna. In this case, beams originating from the transmit antenna not covered by the hand may transmit with a higher transmission power without causing an exposure incident.

In the following, some examples of the form of reporting an exposure incident are presented for embodiments described by means of FIG. 1 and FIG. 2.

An example MPE CSI report scheme indicating required power reduction is provided below.

TABLE 1

| Signalling value | MPE power reduction (dB) |
|---|---|
| 0 | <1 |
| 1 | 1 ... 2 |
| 2 | 2 ... 3 |
| 3 | >3 |

Power reduction may be indicated on a per-transmission (TX) beam basis. The active TX beams may comprise PUCCH or PUSCH beams, for example. The size of the report may be dynamically selected based on a number of beams in use. For example, the report may comprise a set number of bits for each beam pair, or the report may comprise the set number of bits for the strongest beam pairs and a smaller number of bits for other beam pairs. The indication may follow the strongest beam. Alternatively, it may be defined according to average for best-N beams (N being an integer). Another option is to indicate the beams the transmission power of which need to be decreased most or by a certain amount. For example, with four beam pair links and the signalling scheme in Table 1 above would require an eight-bit payload for the CSI indication.

An alternative signalling scheme for MPE CSI report is shown below by means of Table 2. This scheme is relative to a threshold δ for example equal to 4 dB: Here one bit in the MPE CSI report may indicate "an exposure incident" and "recovery" (an option to increase the transmission power), and the indication may be expressed relative to the strongest beam. Alternatively, it may be defined relative to an average of best N beams, with N a suitable integer. Event corresponds to an event where TX power has to be reduced due to the preconfigured MPE user exposure limit, and recovery corresponds to an indication in the other direction, when TX power may be increased.

TABLE 2

| Signalling value | MPR P-MPR event, power decrease (dB) | MPR P-MPR recovery, power increase (dB) |
| --- | --- | --- |
| 0 | $\delta + <2$ | $\delta - >1$ |
| 1 | $\delta + 2 \ldots 4$ | $\delta - 1 \ldots 2$ |
| 2 | $\delta + 4 \ldots 6$ | $\delta - 2 \ldots 3$ |
| 3 | $\delta + >6$ | $\delta - 3 \ldots 4$ |

Instead of, or in addition to, the user device may provide more detailed information for supported user device transmission configuration. For example, this report may include aspects such as a maximum number of physical resource blocks, PRBs, or a maximum uplink bandwidth, time division duplex uplink/downlink configuration or a maximum uplink duty cycle. It may also, or alternatively, include other aspects impacting the device's transmit power defined by uplink power control. Such information could be provided as an indication of maximum supported uplink configuration, for example by providing an index to a table for each parameter maximum supported. The information may be expressed on a per candidate transmit beam basis, where the candidate transmit beam may be characterized as a spatial source reference signal. Examples include special reference signal, SRS, resource, synchronization signal block, SSB, index or CSI-RS resource.

Examples of parameters in the devices' indication of uplink transmission it could support in the given MPE situation, for example on a per-TX beam basis, are given by means of Table 3

TABLE 3

| CSI Index value | Max. number of PRBs or bandwidth, BW | TDD UL/DL configuration | Number of TX antennas affected by MPE | Other parameters impacting UP power control of PUSCH like number of bits per resource element due to different modulation and coding rate |
| --- | --- | --- | --- | --- |
| 0 | 10 RB | 10% | 3 out of 4 antennas | Low-order modulation and less robust coding |
| 1 | ... | ... | | |
| 2 | ... | ... | 1 out of 4 antennas | |
| 3 | FULL BW | 100% | No antennas affected | High order modulation and robust coding |

Figure 3:
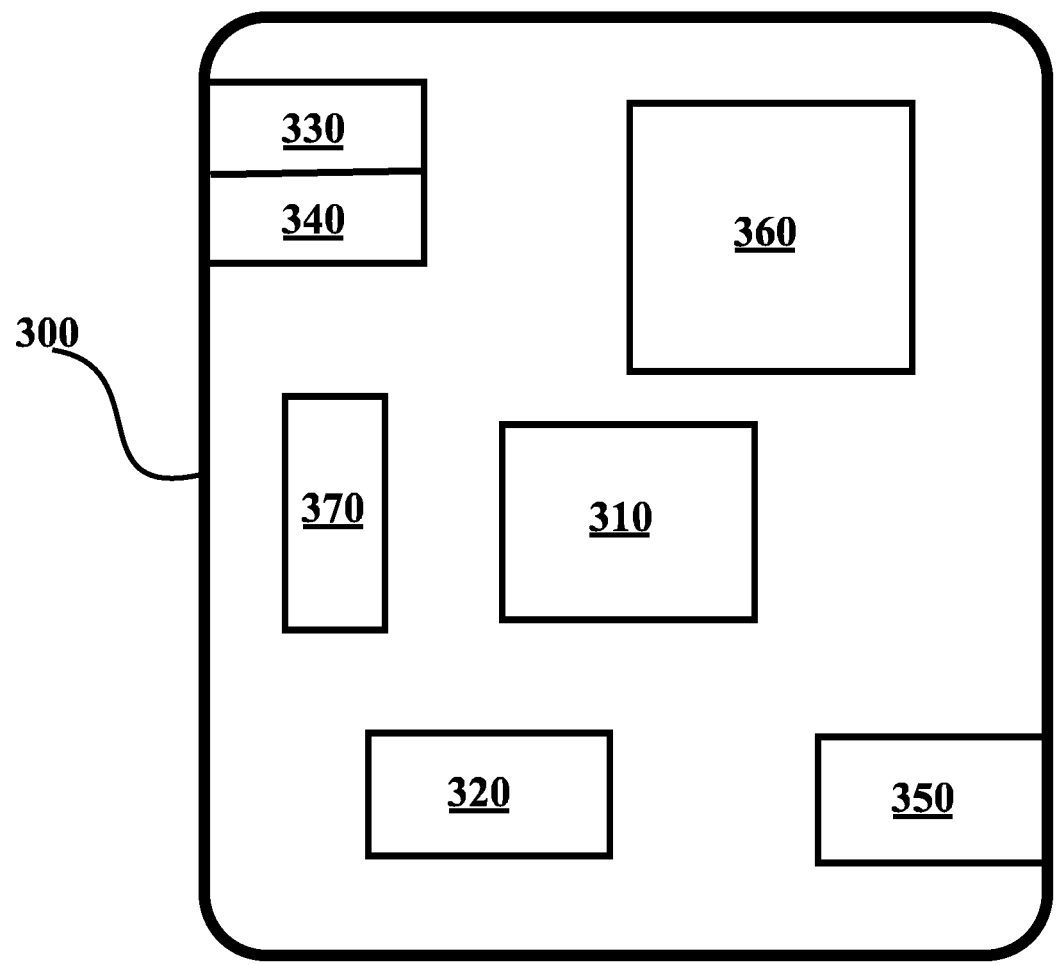
FIG. 3 illustrates an example apparatus capable of supporting at least some embodiments.

FIG. 3 illustrates example apparatuses capable to carry out embodiments described above by means of FIGS. 1 and 2. In the case the apparatus 300 carries out embodiments presented by means of FIG. 1, it may serve as a user device and comprise at least one processor 310, at least one memory including computer program code, the at least one memory 320 and the computer program code being configured to, with the at least one processing core, cause the apparatus at least to: receive from an access node, at least one channel status reporting configuration dedicated for reporting exposure incidents of power or energy density, wherein the at least one channel status reporting configuration comprises at least one exposure indication sequence, determine or predicting an exposure incident for at least one beam, report the exposure incident to the access node by a channel status message comprising the at least one exposure indication sequence, wherein, when the user device is in a connected state using physical uplink shared channel resources, and when the user device is not in the connected state using random access procedure resources according to the at least one channel status reporting configuration, and receive a transmission configuration adjusted based on the reporting. The apparatus may comprise or be coupled to radio parts for transmitting and receiving. Another example of the apparatus comprises means (310, 340) for receiving from an access node, at least one channel status reporting configuration dedicated for reporting exposure incidents of power or energy density, wherein the at least one channel status reporting configuration comprises at least one exposure indication sequence, means (310, 320, 340) for determining or predicting an exposure incident for at least one beam, means (330) for reporting the exposure incident to the access node by a channel status message comprising the at least one exposure indication sequence, wherein, when the user device is in a connected state using physical uplink shared channel resources, and when the user device is not in the connected state using random access procedure resources according to the at least one channel status reporting configuration, and means (340) for receiving a transmission configuration adjusted based on the reporting.

Alternatively, when the apparatus 300 carries out embodiments presented by means of FIG. 2, it may serve as an access node (such as gNB or DU) and comprise at least one processor 310, at least one memory including computer program code, the at least one memory 320 and the computer program code being configured to, with the at least one processing core, cause the apparatus at least to: provide a user device with at least one channel status reporting configuration dedicated for reporting exposure incidents of power or energy density, wherein the at least one channel status reporting configuration comprises at least one exposure indication sequence, receive a report of the exposure incident from the user device by a channel status message comprising the at least one exposure indication sequence, wherein, when the user device is in a connected state using physical uplink shared channel resources, and when the user device is not in the connected state using random access procedure resources according to the at least one channel status reporting configuration and provide the user device with a transmission configuration adjusted based on the report. The apparatus may comprise or be coupled to radio parts for transmitting and receiving.

Another example of the apparatus comprises means (310, 320, 330) for providing a user device with at least one channel status reporting configuration dedicated for reporting exposure incidents of power or energy density, wherein the at least one channel status reporting configuration comprises at least one exposure indication sequence, means (340) for receiving a report of the exposure incident from the user device by a channel status message comprising the at least one exposure indication sequence, wherein, when the user device is in a connected state using physical uplink shared channel resources, and when the user device is not in the connected state using random access procedure resources according to the at least one channel status reporting configuration, and means (310, 320, 330) for providing the user device with a transmission configuration adjusted based on the report.

Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as determining, transmitting, reducing, receiving and adjusting. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. The transmitter 330 may be means for transmitting. Device 300 may comprise a receiver 340. The receiver 340 may be means for receiving. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively, to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively, to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment, various ways of interconnecting at least two of the aforementioned devices may be selected.

Figure 4:
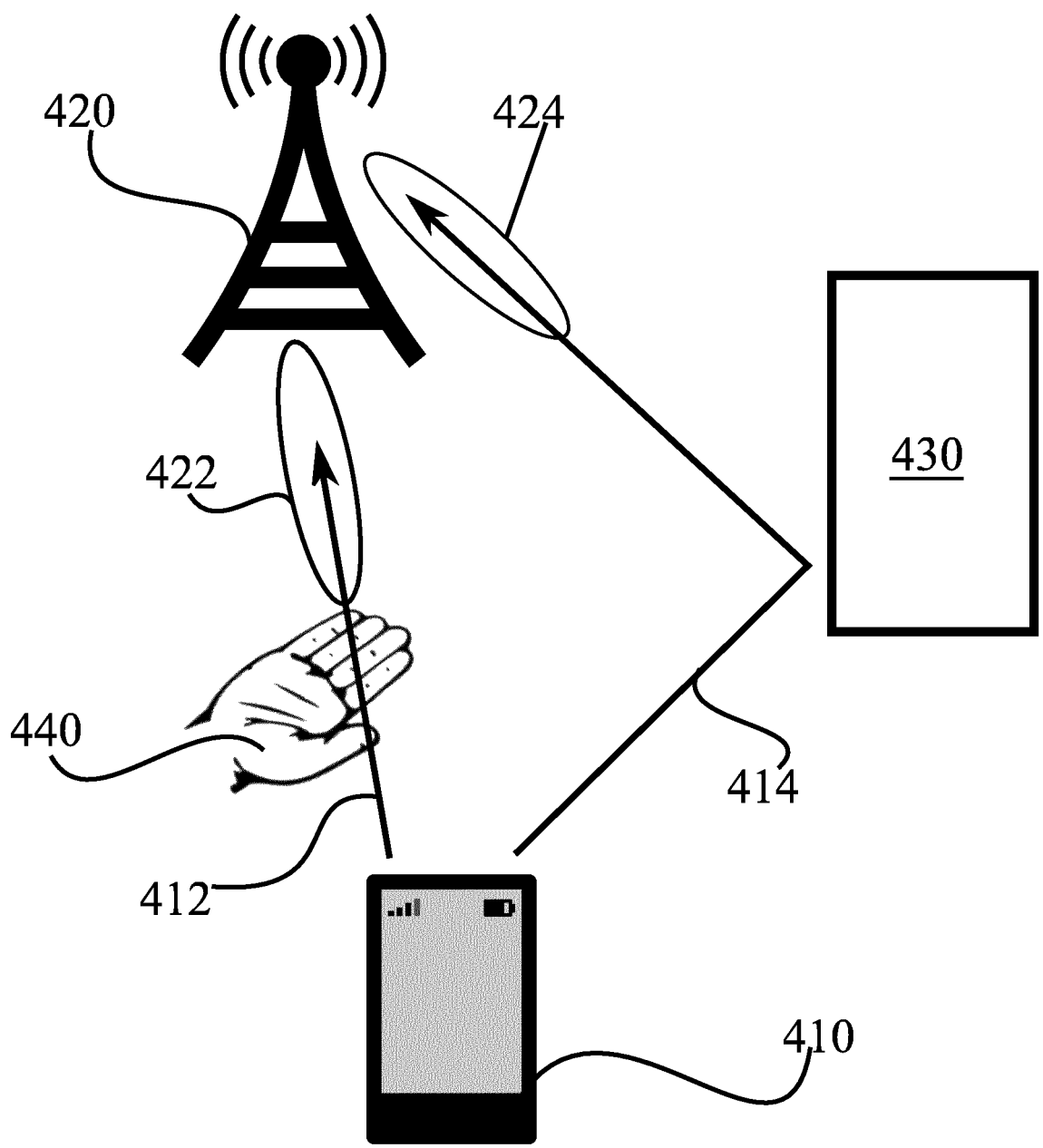
FIG. 4 illustrates an example system in accordance with at least some embodiments.

FIG. 4 illustrates an example system operation in accordance with at least some embodiments. The system comprises user device, UE, 410 and access node 420. In the example of FIG. 4, the access node 420 is a cellular base station, such as a gNB, however as described above, embodiments are not limited to cellular systems.

User device (UE) 410 is in wireless communication with access node 420 over two radio beams 412, 414. Of these, beam 412 is a direct line-of-sight beam and beam 414 involves a reflection from building 430. In normal use, beam 412 would be predominant. The transmit beams 412, 414 may use two distinct antennas of UE 410. The distinct antennas are not illustrated in FIG. 4 for the sake of clarity. Base node 420 has two receive beams 422, 424 configured to receive TX beams 412, 414 of UE 410, respectively.

UE 410 determines that the user's hand 440 is placed between UE 410 and access node 420, as illustrated. Considering the transmit power, UE 410 may determine that the preconfigured EM user exposure limit or threshold is exceeded (or will soon be exceeded), and responsive to this determination UE 410 transmits to access node 420 an indication. The indication may further provide information describing the effect of the exceeding on the transmit beams, in particular that while beam 412 is affected and will be reduced in transmit power, beam 414 is not affected and need not be reduced in power. The access node may respond accordingly and rely more on receive beam 424, which received transmit beam 414 of UE 410.

Figure 5:
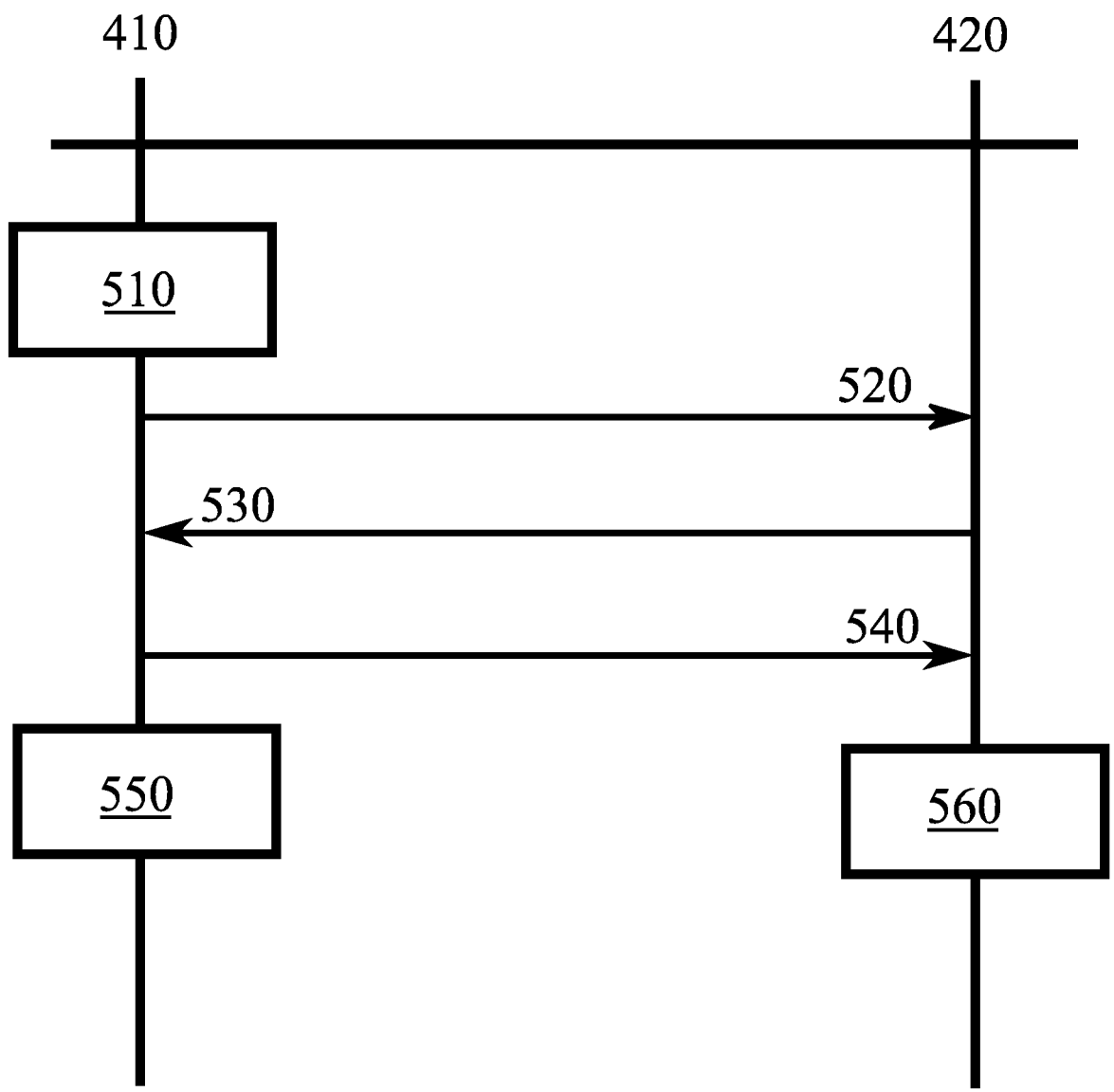
FIG. 5 is a flow graph of a method in accordance with at least some embodiments.

FIG. 5 is an example of a signalling graph with respect to the embodiments described above. Time advances from the top toward the bottom. On the vertical axes are disposed UE 410 of FIG. 4 on the left, and access node 420 of FIG. 4 on the right.

In phase 510, UE 410 determines that a user is approaching UE 410, for example, this determination may be based on sensor data of a proximity sensor. The UE determines that TX power will need to be reduced, as described herein above. UE 410 may also evaluate, how much the TX power will need to be reduced, in some embodiments on a per-TX beam basis. The UE may determine, what kind of transmit configurations it will be able to support after the reduction of TX power. This may include a UL/DL configuration, modulation and/or coding adaptations, as described herein above.

In phase 520, UE 410 provides an indication of an exposure incident to access node 420, by a message comprising an exposure indication sequence, as described above. Access node 420 may grant resources to UE 410, phase 530, and UE 410 then uses these resources to provide a more detailed report of the MPE situation. As described above, this more detailed report may include data on the what the MPE situation will affect individual ones of TX beams of UE 410, and the transmit configurations it will be able to support after the reduction of TX power. The transmission of the more detailed report is illustrated in FIG. 5 as phase 540.

In phase 550, UE 410 may reduce its TX power. UE may receive an adapted transmission configuration, wherein one or more transmission parameters are adjusted, such as a UL/DL configuration, modulation scheme and/or coding rate, as described above. Thus, access node 420 may modify transmission configuration parameters of the connection between UE 410 and access node 420 in phase 560, which may take place before, after or at the same time as phase 550. For example, access node 420 may change the receive beams it uses and/or adapting a UL/DL configuration, modulation scheme and/or coding rate, to match the actions of UE 410 in phase 550. In some embodiments, the network decides on the UL transmission connection parameters as requested by UE 410, and access node 420 informs UE 410 of the new connection parameters. UE 410 then takes these new connection parameters into use in phase 550.

After phases 550 and 560, UE 410 may determine that the user is moving away and, consequently, the MPE requirement may be respected with a higher TX power level. UE 410 may be configured to responsively reporting the option to the access node, by using a dedicated sequence correspondingly to the exposure indication sequence. Access node 420 may inform UE 410 of the new connection parameters. UE 410 then takes these new connection parameters into use.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another. Furthermore, the described features, structures, or characteristics may be combined in any suitable manner in one or more embodiments.

ACRONYMS LIST

3GPP third generation partnership project
5G fifth generation
CAZAC constant amplitude zero auto correlation
CG configured grant
CSI channel state indication
DCI downlink control information
DL downlink
EM electromagnetic
EIRP effective isotropic radiated power
FCC federal communications commission
FR frequency range
IAB integrated access backhaul
MPE maximum permissible exposure
NR new radio
OSI open systems interconnection
P-MPR power management maximum power reduction
PDSCH physical downlink shared channel
PRACH physical random access channel
PUCCH physical uplink control channel
PUSCH physical uplink shared channel RRC radio resource control
SR scheduling request
SRS special reference signal
SSB synchronization signal block
TDD time division duplex
TX transmit, transmission
UCI uplink control information
UI user interface
UE user equipment
UL uplink
ZAC zero auto correlation

The invention claimed is:

1. A method, comprising:
receiving, by a user device from an access node, at least one channel status reporting configuration dedicated for reporting exposure incidents of power or energy density, wherein the at least one channel status reporting configuration comprises at least one exposure indication sequence;
determining or predicting an exposure incident for at least one beam, and
as a response to the determining or predicting the exposure incident adjusting experienced transmission power,
reporting the exposure incident to the access node by a channel status message comprising the at least one exposure indication sequence and information on the adjusting using physical channel resources according to the at least one channel status reporting configuration, and receiving, as a response to the reporting, control information, wherein the control information comprises acknowledgement to the adjusting, transmission configuration and/or information request,
wherein the at least one exposure indication sequence is a computer-search based zero autocorrelation sequence/cyclic shift or channel state information indication.

2. The method of claim 1, wherein the physical channel resources comprise a scheduling request process configuration, channel state information process resources, data-less physical uplink shared channel resources, configured grant physical uplink shared channel resources, contention-based random access resources for MSG3 message and contention-free random access resources.

3. The method of claim 1, wherein the at least one exposure indication sequence is a Zadoff-Chu sequence/cyclic shift, or constant amplitude zero autocorrelation sequence/cyclic shift, computer-search based zero autocorrelation sequence/cyclic shift and channel state information indication.

4. The method of claim 1, wherein the reporting exposure incident further comprises informing: amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

5. The method of claim 1, wherein the information request further comprises a request for informing: amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

6. A method, comprising:
providing, by an access node, a user device with at least one channel status reporting configuration dedicated for reporting exposure incidents of power or energy density, wherein the at least one channel status reporting configuration comprises at least one exposure indication sequence;
receiving a report of the exposure incident for at least one beam from the user device by a channel status message comprising the at least one exposure indication sequence and information on adjusting experienced transmission power carried out by the user device using physical channel resources according to the at least one channel status reporting configuration, and
providing the user device with control information, wherein the control information comprises acknowledgement to the adjusting, transmission configuration and information request,
wherein the at least one exposure indication sequence is a computer-search based zero autocorrelation sequence/cyclic shift or channel state information indication.

7. The method of claim 6, wherein the physical channel resources comprise a scheduling request process configuration, channel state information process resources, data-less physical uplink shared channel resources, configured grant physical uplink shared channel resources, contention-based random access resources for MSG3 message and contention-free random access resources.

8. The method of claim 6 wherein the at least one exposure indication sequence is a Zadoff-Chu sequence/cyclic shift, or constant amplitude zero autocorrelation sequence/cyclic shift, computer-search based zero autocorrelation sequence/cyclic shift and channel state information indication.

9. The method of claim 6, wherein the report of the exposure incident further comprises information on amount of needed transmission power adjustment, uplink bandwidth request, number of physical resource blocks request, downlink/uplink resource configuration request, beam-pair request and maximum uplink duty cycle request for the adjusted transmission configuration, wherein the further information is expressed by at least part of the at least one exposure indication sequence.

10. The method of 6, wherein the information request further comprises a request for informing amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

11. An apparatus comprising at least one processor, at least one memory including computer program code, the at least one memory and the computer program code being configured to, with the at least one processor, cause the apparatus at least to:
receive, by a user device from an access node, at least one channel status reporting configuration dedicated for reporting exposure incidents of power or energy density, wherein the at least one channel status reporting configuration comprises at least one exposure indication sequence;

determine or predict an exposure incident for at least one beam, and as a response to the determining or predicting the exposure incident adjust experienced transmission power, report the exposure incident to the access node by a channel status message comprising the at least one exposure indication sequence and information on the adjusting using physical channel resources according to the at least one channel status reporting configuration, and receive, as a response to the reporting, control information, wherein the control information comprises acknowledgement to the adjusting, transmission configuration and information request, wherein the at least one exposure indication sequence is a computer-search based zero autocorrelation sequence/cyclic shift or channel state information indication.

12. The apparatus of claim 11, wherein the physical channel resources comprise a scheduling request process configuration, channel state information process resources, data-less physical uplink shared channel resources, configured grant physical uplink shared channel resources, contention-based random access resources for MSG3 message and contention-free random access resources.

13. The apparatus of claim 11, wherein the at least one exposure indication sequence is a Zadoff-Chu sequence/cyclic shift, or constant amplitude zero autocorrelation sequence/cyclic shift, computer-search based zero autocorrelation sequence/cyclic shift and channel state information indication.

14. The apparatus of claim 11, wherein the reporting exposure incident further comprises information on amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

15. The apparatus of claim 11, wherein the information request further comprises a request for informing: amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

16. An apparatus comprising at least one processor, at least one memory including computer program code, the at least one memory and the computer program code being configured to, with the at least one processor, cause the apparatus at least to:

provide, by an access node, a user device with at least one channel status reporting configuration dedicated for reporting exposure incidents of power or energy density, wherein the at least one channel status reporting configuration comprises at least one exposure indication sequence;

receive a report of the exposure incident for at least one beam from the user device by a channel status message comprising the at least one exposure indication sequence and information on adjusting experienced transmission power carried out by the user device using physical channel resources according to the at least one channel status reporting configuration, and provide the user device with control information, wherein the control information comprises acknowledgement to the adjusting, transmission configuration and information request, wherein the at least one exposure indication sequence is a computer-search based zero autocorrelation sequence/cyclic shift or channel state information indication.

17. The apparatus of claim 16, wherein the physical channel resources comprise a scheduling request process configuration, channel state information process resources, data-less physical uplink shared channel resources, configured grant physical uplink shared channel resources, contention-based random access resources for MSG3 message and contention-free random access resources.

18. The apparatus of claim 16 wherein the at least one exposure indication sequence is a Zadoff-Chu sequence/cyclic shift, or constant amplitude zero autocorrelation sequence/cyclic shift, computer-search based zero autocorrelation sequence/cyclic shift and channel state information indication.

19. The apparatus of claim 16, wherein the report of the exposure incident further comprises information on amount of needed transmission power adjustment, uplink bandwidth request, number of physical resource blocks request, downlink/uplink resource configuration request, beam-pair request and maximum uplink duty cycle request for the adjusted transmission configuration, wherein the further information is expressed by at least part of the at least one exposure indication sequence.

20. The apparatus of claim 16, wherein the information request further comprises a request for informing amount of needed transmission power adjustment, uplink bandwidth request, number of physical resource blocks request, downlink/uplink resource configuration request, beam-pair request and maximum uplink duty cycle request for the adjusted transmission configuration, wherein the further informing is expressed by at least part of the at least one exposure indication sequence.

* * * * *